United States Patent [19]

Franklin

[11] 3,754,652
[45] Aug. 28, 1973

[54] FILTER PUMP SYSTEM FOR LIQUID CONVECTION COOKER

[76] Inventor: Dan R. Franklin, 12830 Lacy Dr., Silver Spring, Md.

[22] Filed: Oct. 26, 1972

[21] Appl. No.: 301,075

[52] U.S. Cl............................ 210/167, 210/DIG. 8
[51] Int. Cl.............................................. B01d 35/28
[58] Field of Search............... 210/167, 171, DIG. 8, 210/194–197; 99/403

[56] References Cited
UNITED STATES PATENTS

| | | | |
|---|---|---|---|
| 1,843,157 | 2/1932 | Howe | 210/167 |
| 3,356,218 | 12/1967 | Grudoski | 210/DIG. 8 |
| 2,614,484 | 10/1952 | Caruso | 99/403 |
| 3,477,361 | 11/1969 | Bradshaw | 210/167 |

Primary Examiner—Samih N. Zaharna
Assistant Examiner—T. A. Granger
Attorney—Edward J. Brenner, Russell J. Egan et al.

[57] ABSTRACT

The present pump and filter system is used in a liquid convection cooker to create a vortex which causes circulation of the liquid in the tank or vat of the cooker in such manner as to achieve substantially uniform liquid temperature and to prevent the liquid from becoming laden with food particles. The pump is positioned directly in the vat along one wall thereof and is arranged to draw liquid from the periphery of a well located centrally in the bottom of the vat. The liquid is returned to the vat horizontally through a nozzle spaced above the bottom of the vat and at an angle with respect to the vat walls. The vortex is created, at least in part, by the pumping action and the shape of the components. Those parts of the pump and filter which actually contact the liquid can be readily removed from the vat, disassembled for cleaning and can even be sterilized. There is no necessity for emptying the vat before removing either the pump or the filter.

9 Claims, 6 Drawing Figures

Patented Aug. 28, 1973

Patented Aug. 28, 1973 3,754,652

FILTER PUMP SYSTEM FOR LIQUID CONVECTION COOKER

BACKGROUND OF THE INVENTION

1. The Field of Invention

The present invention relates to an improved liquid convection cooker and, more particularly, to a pump and filtering system for creating a vortex which improves the circulation of the liquid contained in such a cooker so as to enhance filtering and eliminate non-uniformity in liquid temperature.

2. Description of the Prior Art

Fry cookers, more commonly known as "deep fat fryers" have long been known in the culinary field. Basically this type of cooker has a tank or vat which is filled with heated animal or vegetable oil or au jus liquid and into which the food to be cooked is placed. The liquid is heated either by applying heat externally to the vat or, more commonly, by electric coils immersed in the liquid and lying adjacent the bottom of the vat. This type of cooker has become a main piece of equipment for many commercial or large scale food preparation establishments, such as restaurants, hospitals, school cafeterias, etc., since they are particularly useful when large volumes of food must be prepared. There are also a great many of these fry cookers found in private homes.

While liquid convection cookers have many advantages, they have not been without disadvantages. For example, there is a particular problem associated with cooking frozen or partially thawed food in liquid convection cookers. Normally the heating coils will establish, by thermal action, a vertically circulating flow in the liquid. However, when food filled baskets are placed in the tank, this vertical circulation pattern is inhibited and broken up by both the baskets and the food contained therein. The frozen or partially thawed food cools the liquid in the immediate vacinity of the food thus requiring a longer time for the food to be sealed and cooked. The normal liquid temperature of 350° – 360° F, for oil, has been known to drop about 40° and then take up to two and a half minutes to return to the initial temperature when cooking frozen food.

The foods generally cooked in this type of cooker are frequently coated with a bread-like or batter layer, particles of which drop off the food as it is cooked. These particles accumulate at the bottom of the vat or tank causing an unsanitary condition and one in which odors and flavors of one type of food are likely to be transmitted to subsequent batches of food as they are cooked in the same liquid. This flavor transmission is in part caused by oil laden particles of food or batter dropping to the bottom of the tank and being circulated by the normal vertical flow as discussed above. The above mentioned extended cooking time allows a longer time for the food to absorb greater amounts of the liquid thereby causing the food to have a greasy or oily taste.

Attempts have been made to overcome the above discussed problems through the use of various types of pumps and filters. For example, U.S. Pat. No. 3,477,361 shows a so called "deep fat fryer" which includes an externally mounted pump connected to draw the liquid fat through a filtering arrangement located in a well at the bottom of the fryer and return the liquid to the tank through a side port. This type of arrangement does filter the food particles out of the liquid fat; however, it is not without disadvantages. Such a system is extremely difficult to clean and service because of the extra plumbing involved in having an externally mounted pump. In order to clean a fryer equipped in this manner, the vat must be completely emptied before the pump can be disassembled and cleaned. Of course, the connecting pipes must also be cleaned, an operation requiring the complete emptying of the vat. It is not possible to avoid draining the vat by including check valves in the connecting lines since such valves would also have to be cleaned. Thus, while the system described in this patent is a step towards improving deep fat fryers by filtering the liquid, it leaves a lot to be desired in economy and practical functioning.

SUMMARY OF THE INVENTION

The present pump and filtering system is intended for use in a conventional liquid convection cooker having a well formed substantially in the center of the bottom of the bat. A filter is positioned across the well. The pump extends into the vat adjacent one wall thereof. A conduit connects the pump to a peripherial edge of the well to draw the liquid from the well in such manner that a vortex is created in the vat. The pump returns the liquid horizontally to the vat at an angle with respect to the walls thereof and spaced from the bottom of the vat to enhance the vortex action. A pump drive is mounted outside the vat and operatively connected to drive the pump.

It is an object of the present system to filter liquid in a liquid convection cooker and to cause greater circulation of the filtered liquid to substantially eliminate zones of uneven temperature while assuring flow through the filter to entrap substantially all loose food particles in the vat.

It is also an object of the present system to provide a filter and pump system for liquid convection cookers which system can be readily and easily removed from the vat of the cooker, disassembled and cleaned without the necessity for draining the vat.

It is a further object of the present system to create a vortex in the liquid contained in the vat of a liquid convection cooker which will assure adequate circulation to achieve substantially uniform temperatures of the liquid while preventing the build up of food particles on the bottom of the vat.

DESCRIPTION OF THE PREFERRED EMBODIMENT

Figure 1:
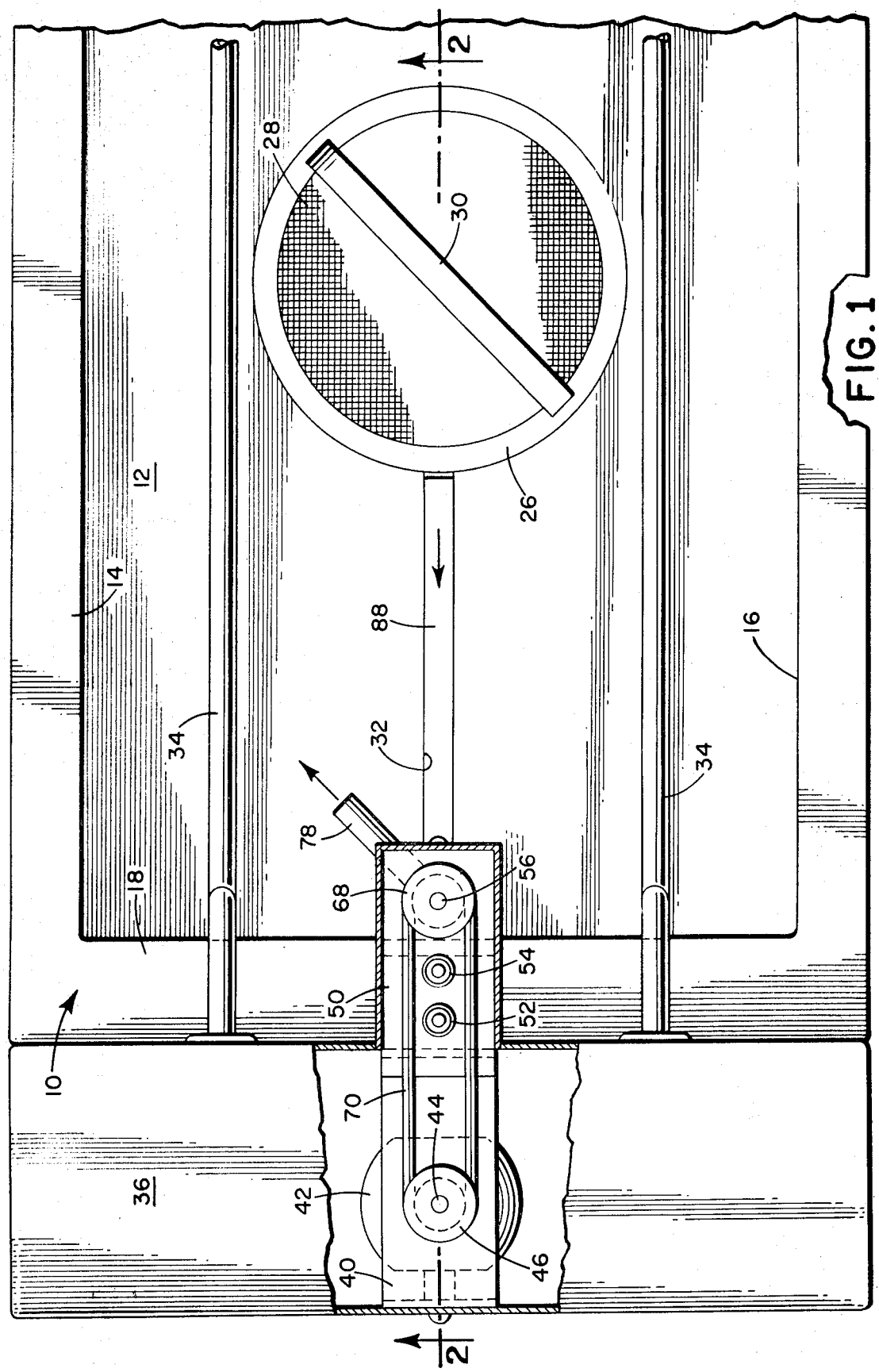
FIG. 1 is a partial top plan view of a liquid convection cooker including the subject pump and filtering system.

The subject pump and filtering system is used in combination with a liquid convection cooker of conventional design, thus the cooker itself will only be generally described. The cooker includes a tank or vat 10 formed by a bottom 12 and integrally connected side walls 14, 16 rear wall 18 and front wall (not shown).

All walls are preferably formed of stainless steel having a double spaced wall construction with the space filled with heat insulating material 20, such as expanded foam. A hemispherical recess or well 22 is formed substantially at the center of the tank bottom 12 with a annular recess 24 formed about the periphery of the well to receive therein the annular lip 26 of filter element 28. A handle 30 is provided on the filter element. A rectangular channel 32 extends from a rear peripherial edge of the well to a point adjacent rear wall 16. An electric coil 34 is positioned adjacent the bottom of the tank and is connected to a control unit (not shown) in rear control housing 36 by conventional means. The coil controls would include energizing and temperature control means (not shown). The tank is filled with a cooking liquid 38 which may be animal or vegtable oil or dehydrated au jus mixed with water.

The pump assembly includes a frame 40 which extends from the rear control housing 36 over the upper edge of the rear wall 16. Motor 42 is mounted on the frame 40 within the rear control housing with its drive shaft 44 substantially vertical. Drive pulley 46 is fixed to the free end of the drive shaft 44. The pump has a cylindrical housing member 48 the upper end of which is press fitted into a pump mounting bracket 50. A pair of thumb screws or the like 52, 54 detachably secure the bracket 50 to frame 40. An impeller shaft 56 is substantially vertically mounted in housing 48 by upper and lower bearing members 58, 60, respectively, which are press fitted into the housing. The bearings define a first chamber 62 therebetween. This chamber 62 is provided with a pair of oppositely disposed, laterally extending slots 64, 66, the purpose of which will be discussed below. The longitudinal axes of these slots lie in a plane which is substantially parallel to rear wall 18. A pulley 68 is fixed to the upper end of shaft 56 and is drivingly connected to pulley 46 by endless belt 70. An impeller blade 72 is fixed to the lower end of shaft 56 within a second chamber 74. An outlet port 76 connects this second chamber to a nozzle 78 which is fixed to the housing 48 at an angle of approximately 45° with respect to rear wall 18 and horizontal with respect to bottom 12.

A bottom pump housing member 80 includes an upper peripherical step 82, which tightly engages the lower end of housing 48, an axial through bore 84, and a lower annular flange 86. A conduit or vortex motivator member 88 is sized to closely fit in channel 32 and extend from wel' 22 to member 80. This member 88 is rectangular in cross section and is provided adjacent one end with an annular opening 90 adapted to tightly receive annular flange 86 of member 80. The end of member 88 adjacent the well is profiled including a lower aperture portion 92 conforming to the spherical shape of well 22 and a closed step 94 aligned with the annular recess 24.

Figure 6:
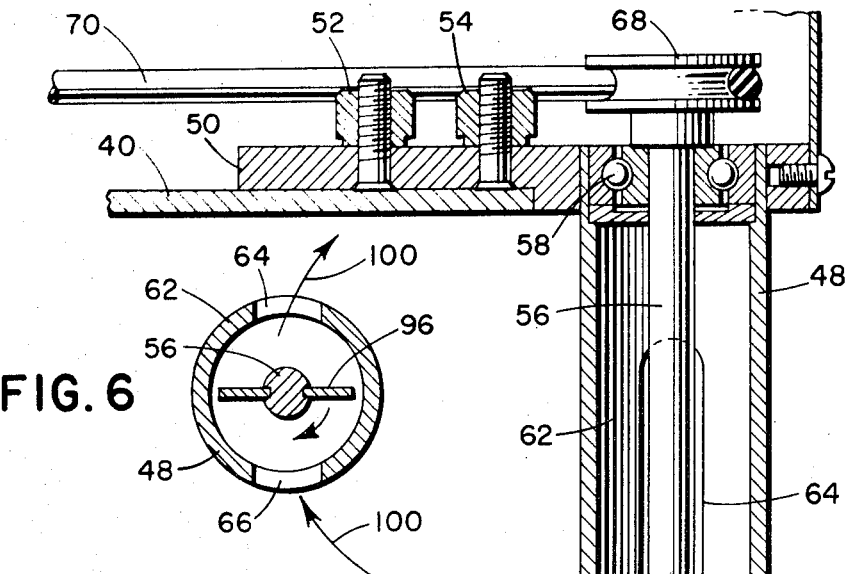
FIG. 6 is a transverse section taken along line 6—6 of FIG. 5.
Figure 3:
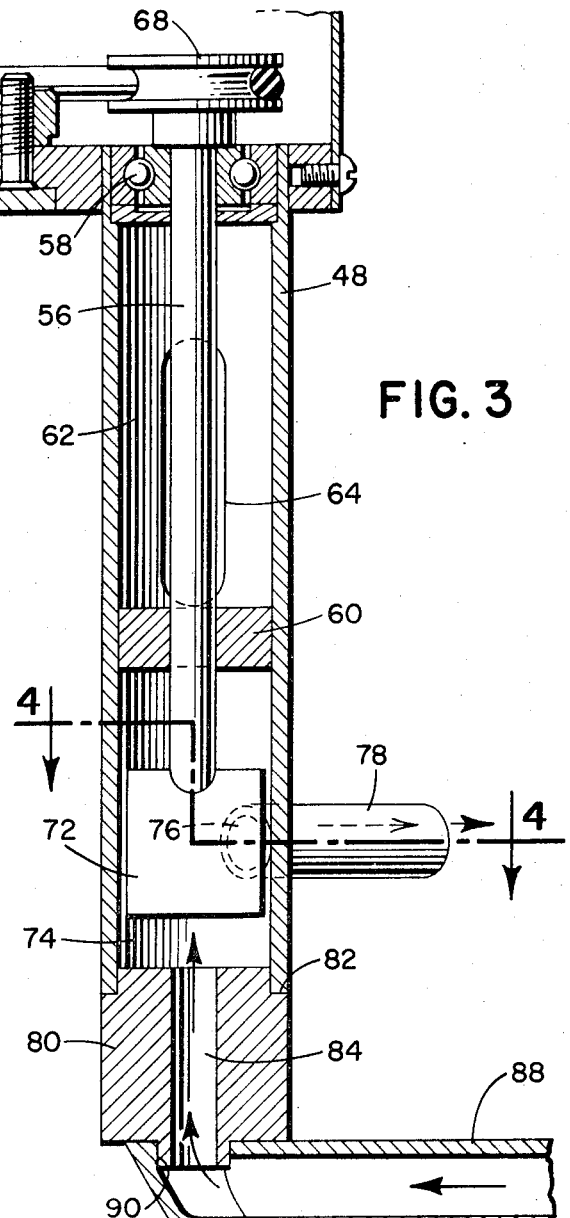
FIG. 3 is a vertical section through the subject pump.
Figure 5:
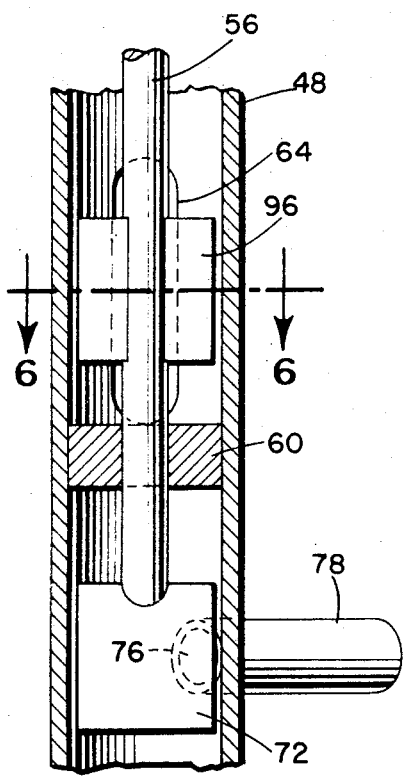
FIG. 5 is a partial vertical section through an alternate embodiment of the subject pump.
Figure 4:
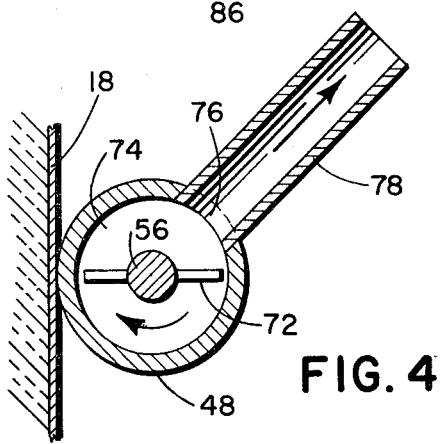
FIG. 4 is a transverse section taken along line 4—4 of FIG. 3.

In the alternate embodiment shown in FIGS. 5 and 6, an additional impeller 96 is provided on shaft 56 in the first chamber 62 formed in housing 48 between bearings 58 to 60.

The subject pump and filtering system operates in the following manner. The pump and filter are inserted into the cooker vat and the pump is energized. The liquid 38 will be drawn downwardly through filter 28 into the well or recess 22 with a vortex being created due, at least in part, to the shape of the well and the drawing off of the liquid from an edge of the well by the pump. This vortex is indicated by arrows 98. The liquid passes through conduit 88 and axial bore 84 to the chamber 74 where it is forced out through the outlet port 76 and nozzle 78 by the motion of the impeller 72. The liquid exits from the outlet in the angled horizontal direction determined by nozzle 78 thus aiding the horizontal circulation of the liquid at a liquid level spaced above the bottom of the vat. This horizontal circulation will aid the above mentioned vortex and, together with the vertical convection circulation caused by the heating coils, will ensure constant movement of the liquid in the vat and prevent the unwanted build up of cool or hot areas. Thus the liquid in the tank will have a substantially uniform temperature throughout.

The rotary motion of the pump shaft will also cause a certain amount of liquid circulation through the upper apertures, 64, 66, as noted by arrows 100. This upper level of circulation can, as shown by the alternate embodiment in FIGS. 5 and 6, be supplemented by the use of an additional impeller 96.

The subject pump and filtering system has a number of advantages not found in the prior art. For example, only three parts of the pump contact the liquid, namely, the housing 48, the conduit 88, and member 80. These parts are made of stainless steel and can be readily removed from the vat and disassembled for cleaning or even sterilizing. The pump motor is separated from the rest of the pump assembly and thus need not be provided with special liquid tight or high temperature withstanding characteristics. The motor, for example, may be a fifteenth horsepower, 208 volt, 3600 rpm motor with the motor and pump pulleys being of equal ratio.

Figure 2:
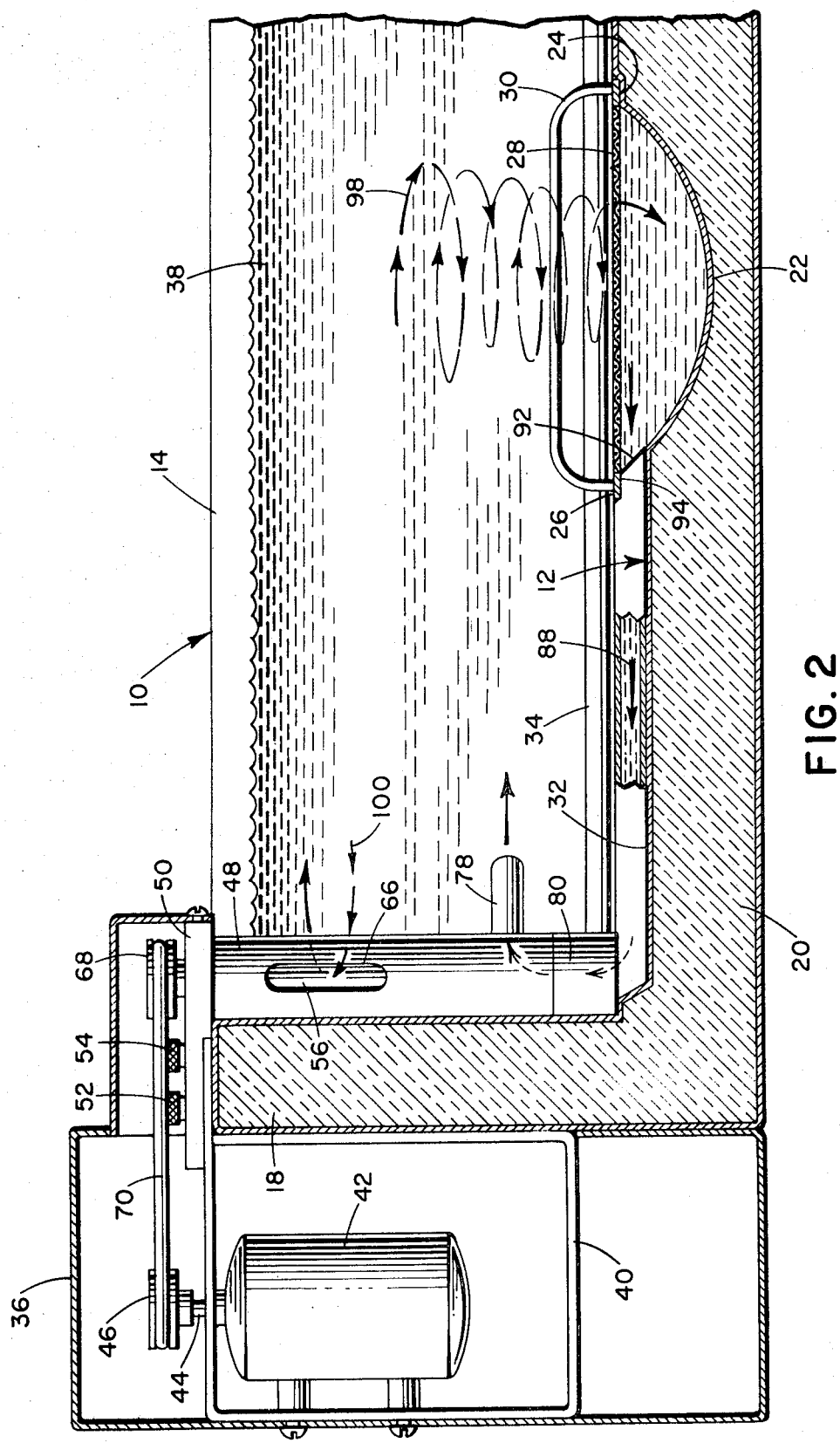
FIG. 2 is a vertical section taken along line 2—2 of FIG. 1.

The shape of the hemispherical well has a two fold purpose. First, its shape and the position of the vortex motivator conduit in relation to the well help to create a horizontal vortex in the liquid as noted by the arrows 98 in FIG. 2. This vortex insures circulation of the liquid in the vat after the cooking baskets have been inserted. Secondly, the strainer or filter is received in the annular groove surrounding the well and serves to filter out a major amount of the food particles which fall to the bottom of the tank, the vortex insuring that the particles will be carried to the filter.

The subject system provides improved circulation of the liquid to eliminate cold spots and promote even temperatures in the vat. The direct advantage of this feature is that foods are subjected to higher initial cooking temperatures and thus are seared and sealed. Less cooking liquid is absorbed by the food and less of the natural juices escape from the food into the cooking liquid. The food thus cooked will have a better flavor and be less oily. The liquid will correspondingly have a greater usable life since it will absorb less of the various food flavors and will be free of food particles.

The filter handle 30 can, if desired, be arranged to extend from the vat adjacent one wall thereof. Such an arrangement allows removal of the filter 28 without requiring either the use of a special tool, such as tongs, or the cooling of the liquid before removing the filter. It should also be noted that, for the obvious reasons, care should be taken to insure that no particles of food large enough to clog conduit 88, for example, a single french fried potatoe, are present in the vat when the filter is removed.

The present invention has been described above in connection with a specific embodiment which must be considered as merely illustrative since many variations and modifications are possible without departing from the spirit of the invention. It is intended that all matter contained in the foregoing description and shown in the accompanying drawings shall be considered as illustrative and not in a limiting sense.

I claim:

1. Apparatus for circulating and filtering hot cooking liquid contained within a cooking vat of a deep fat fryer, said fryer including an open topped liquid containing vat having integral side and bottom walls and means to heat cooking liquid contained in said vat;
   an open topped hemispherically shaped well connected by its upper peripheral edge to a centrally located portion of said bottom wall of said vat with said open top in liquid communication with said vat;
   a filter element spanning said open topped well;
   pump means located in said vat adjacent a side wall thereof, said pump means including a pump housing having an intake port adjacent said bottom wall and an outlet spaced above said bottom wall and below the surface of said cooking liquid, a conduit having an inlet opening on one end positioned at said upper peripheral edge of said well beneath said filter and the other end connected to said intake port, said conduit extending adjacent said bottom wall between said well and the intake port of said housing, and impeller means in said pump housing adapted to pass liquid between said inlet and said outlet,
   whereby said pump means drawing off the liquid from the upper peripheral edge of the well causes creation of a vortex directed toward the well to insure circulation and filtration of all the liquid within the vat as well as maintaining the temperature of the liquid by keeping it at all times within the vat.

2. The apparatus according to claim 1 wherein said filter element comprises
   a planar filter element having an outer dimension greater than said open topped well.

3. The apparatus according to claim 2 further comprising
   handle means attached to said filter element.

4. The apparatus according to claim 2 further comprising an annular recess in said bottom wall surrounding the upper peripheral edge of said well, a peripheral edge of said filter element engaging in said annular recess.

5. The apparatus according to claim 1 wherein said pump housing includes
   a cylindrical member having a chamber therein, said intake port and said outlet opening into said chamber;
   said impeller means including a shaft with at least one blade fixedly attached thereto;
   bearing means mounting the shaft of said impeller means for rotation within said housing with said blades positioned within said chamber; and
   drive means operatively connected to drivingly rotate said shaft.

6. The apparatus according to claim 5 further comprising
   nozzle means fixed to the outlet of said pump housing extending parallel to the bottom of said vat and at an angle of substantially 45° with respect to at least one side wall of said vat.

7. The apparatus according to claim 5 wherein said bearing means comprises
   first and second bearings vertically spaced within said pump housing defining a second chamber therebetween; and
   a pair of opposing slots formed in said pump housing providing liquid communication to said second chamber, the longitudinal axes of said slots lying in a plane parallel to that of the adjacent vat wall whereby motion is imparted to the liquid in the vat by rotation of said shaft.

8. The apparatus according to claim 1 wherein
   said well has an annular recess formed about the upper peripheral edge thereof;
   said conduit having said inlet opening profiled to conform to the shape of said well and stepped to conform to the shape of said annular recess;
   said pump housing including a cylindrical member positioned vertically in said vat with said intake port at the bottom end of said cylindrical member;
   means to rotatably drive said impeller means; and
   nozzle means fixed to said housing outlet parallel with the bottom of said vat and at an angle of approximately 45° with respect to a side wall of said vat whereby liquid in said vat is circulated both by the vortex formed in drawing liquid from said well and by returning filtered liquid to said vat at said angle.

9. In combination with a deep fat fryer including an open topped vat having integral side and bottom walls for retaining a quantity of hot cooking liquid therein and means to heat the liquid within said vat, an apparatus for circulating and filtering the hot cooking liquid within said vat comprising;
   an open topped hemispherically shaped well connected by its peripherial edge so as to be substantially centered in a bottom wall of said vat with said open top of said hemispherically shaped well in liquid communication with the vat;
   filter means extending completely across said open top of said well;
   pump means mounted in said vat adjacent a side wall thereof, said pump means including a cylindrical housing having an intake port adjacent the bottom wall of the vat and a horizontal outlet spaced above the bottom wall of the vat and below the surface of the cooking liquid, impeller means mounted in said cylindrical housing adapted to move liquid from said intake port to said outlet, means to rotatably drive said impeller means, and conduit means having one end connected to said intake port of said cylindrical housing and the other end opening at said upper peripheral edge of said hemispherically shaped well below said filter, said conduit means lying within said vat adjacent the bottom wall thereof;
   whereby said pump means drawing off said liquid from the upper peripherial edge of said well causes creation of a vortex directed toward said well thus insuring circulation of all the liquid within said vat while maintaining the temperature of the liquid by keeping it within the vat at all times during the circulating and filtering process.

* * * * *